May 29, 1962  D. B. LEVINS  3,036,462
MASS FLOWMETER

Filed April 7, 1959  3 Sheets-Sheet 1

INVENTOR.
Dave B. Levins
BY Richard E. Hosley

His Attorney

May 29, 1962  D. B. LEVINS  3,036,462
MASS FLOWMETER

Filed April 7, 1959  3 Sheets-Sheet 3

INVENTOR.
Dave B. Levins
BY Richard E. Hosley
His Attorney 3,036,462
MASS FLOWMETER
Dave B. Levins, Swampscott, Mass., assignor to General Electric Company, a corporation of New York
Filed Apr. 7, 1959, Ser. No. 804,758
6 Claims. (Cl. 73—194)

This invention relates to mass flowmeters and, more particularly, to an angular momentum type fluid mass flowmeter of novel and improved construction.

The present invention is particularly concerned with a fluid mass flowmeter of the angular momentum type and, more specifically, with such a flowmeter wherein there is provided a rotatable fluid accelerating impeller disposed in coaxial axially spaced array with a resiliently restrained turbine and wherein fluid accelerated by the impeller will impinge upon the turbine to cause a deflection thereof which is proportional to the mass flow of the fluid accelerated by the impeller. A flowmeter of this general type is covered by Patent No. 2,714,310, issued August 2, 1955, in the name of Frederic B. Jennings, the assignee of this patent also being the assignee of the present invention.

While a flowmeter constructed as shown in the aforementioned patent is fully satisfactory from an operational and performance standpoint, the specific arrangement of elements is for certain applications not in keeping with a necessity or desirability for compactness and small size. Accordingly, it is the primary object of this invention to provide a fluid mass flowmeter of the general type covered by the aforementioned patent but having a novel and improved construction and arrangement of elements which results in a more compact device particularly suited for manufacture in relatively small sizes.

It is a further object of this invention to provide a flowmeter of the general type covered by the aforementioned patent having a novel and improved construction whereby the making of adjustments in certain of the elements of the flowmeter is facilitated and whereby the over-all performance of the flowmeter is improved.

The manner in which the objects of this invention are achieved in a specific embodiment of the invention will be readily understood from the following description taken in connection with the accompanying drawings, in which.

Figure 1:
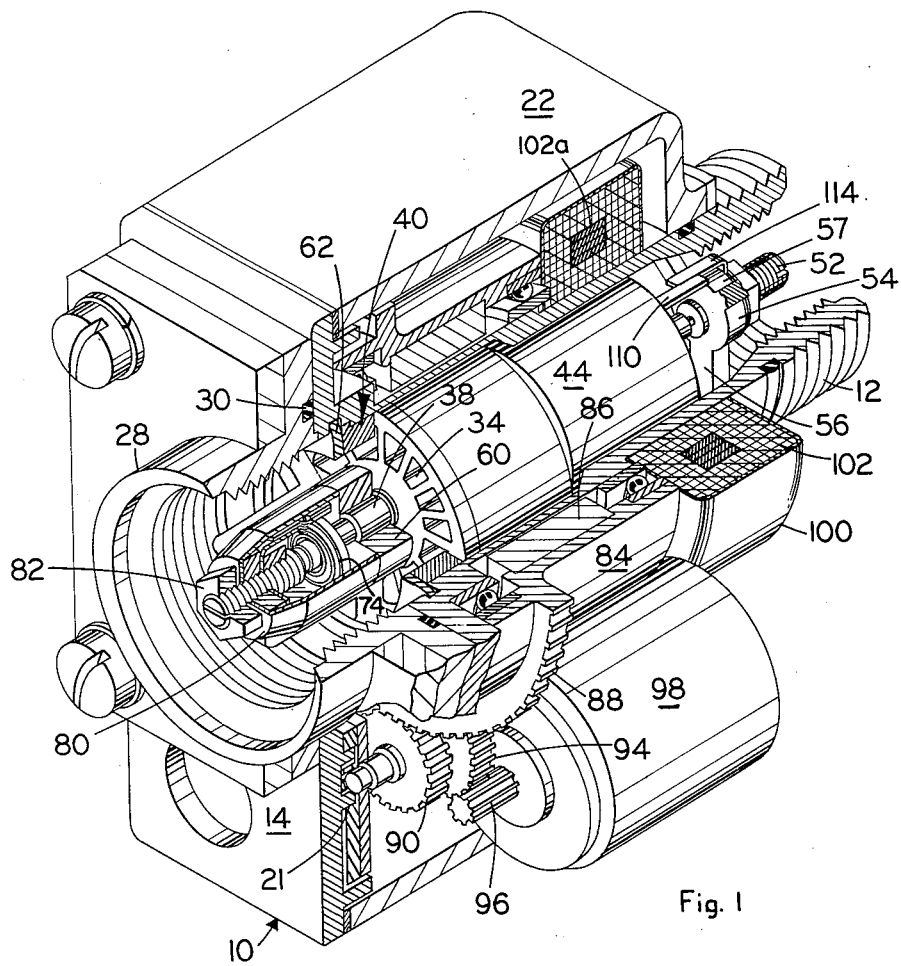
FIG. 1 is a perspective view, partly in section, of a fluid mass flowmeter of the angular momentum type constructed in accordance with this invention.
Figure 2:
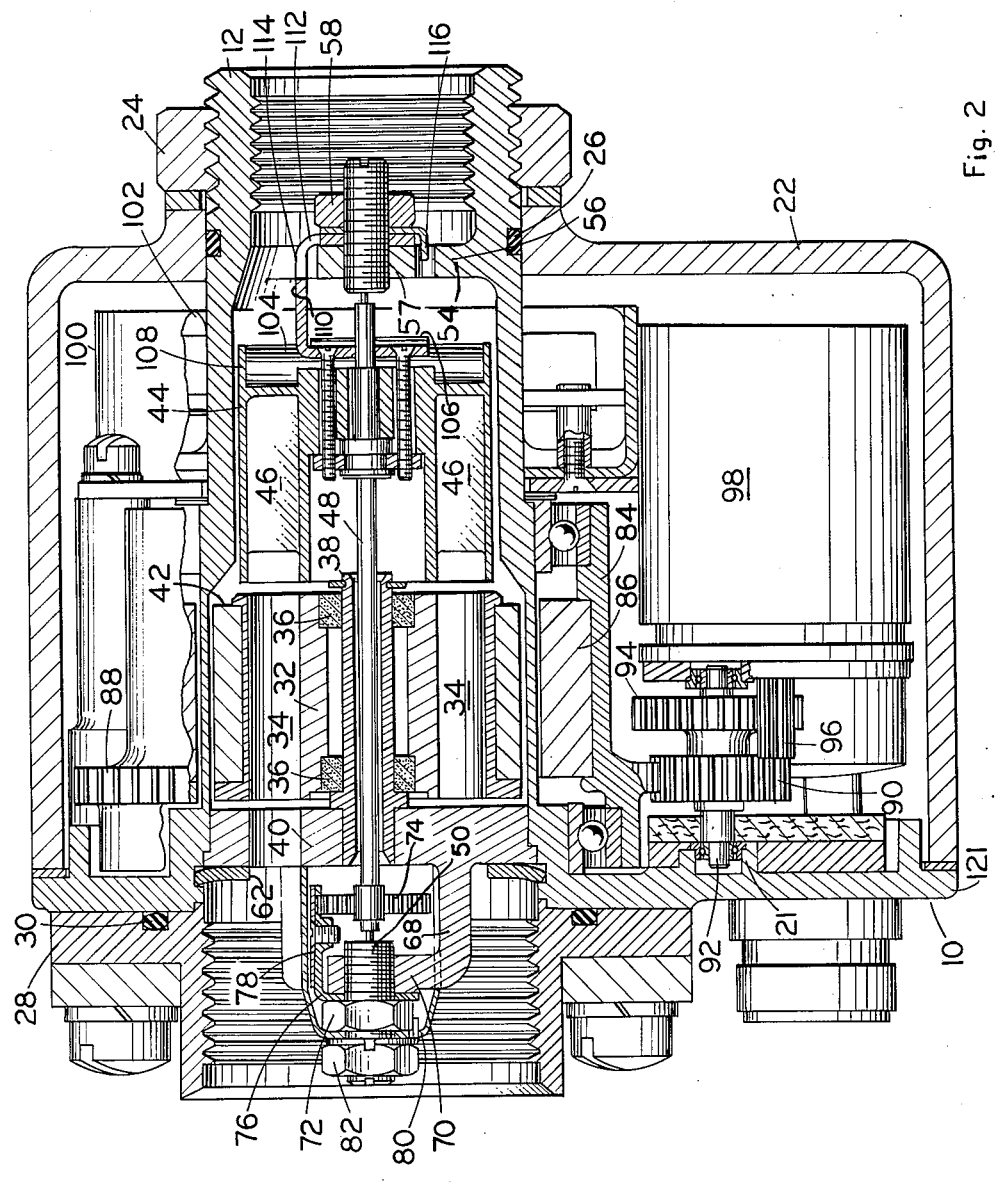
FIG. 2 is an enlarged longitudinal cross sectional view of the flowmeter of FIG. 1.
Figure 3:
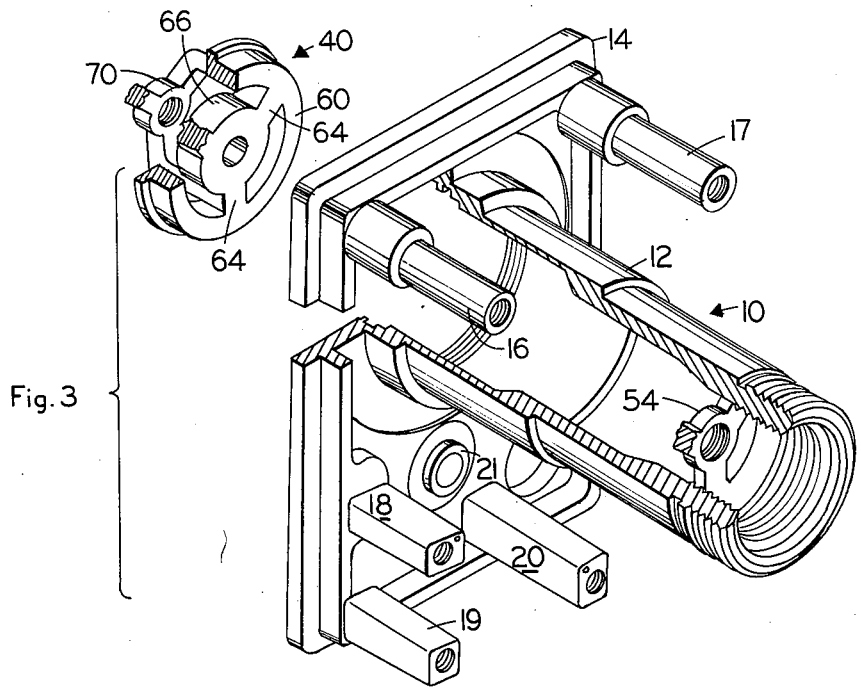
FIG. 3 is a reduced exploded perspective view, partly in section, of a portion of the flowmeter of FIG. 1.

With reference to the drawings, and particularly FIGS. 1 to 3, the flowmeter shown therein comprises a main casing or housing 10, shown most clearly in FIG. 3, which includes an elongated cylindrical member or tube 12 which is open at both ends and which has an imperforate side or circumferential wall. For a reason which will be apparent from the following description, it is preferred that the housing 10 or at least the cylinder 12 be fabricated from a non-magnetizable material, such as aluminum. Formed integrally with the tubular member 12 at one end thereof is a flange or mounting plate 14 extending at right angles to the axis of the tube or pipe 12 and having integral therewith mounting posts 16–20 which extend at right angles to the plate 14 toward the opposite end of the tube 12 in parallel with the axis of the tube. The plate 14 is also integrally provided with a boss 21. The purpose of the posts 16–20 and boss 21 will be readily apparent from the following description.

The periphery of the plate 14 is configured to provide a seat for a generally rectangular cover 22, which, as best shown in FIG. 2, is held in assembly on the flange 14 by means of a retaining nut 24 threadably engaged over the end of the pipe 12 opposite the flange 14. A seal 26 is provided between the cover 22 and pipe 12 and between the cover and flange 14 to assure a dust-tight enclosure. With reference to FIGS. 1 and 2, a pipe coupling or adaptor 28 is bolted to the outer face of the flange 14 and is provided with a threaded opening coaxially of the pipe 12 for coupling to a fluid line. A seal 30 is provided between the oppositely engaged faces of the adaptor 28 and flange 14.

Disposed coaxially within the pipe 12 is a cast impeller 32 which, as shown in FIGS. 1 and 2, comprises a generally cylindrical member arranged coaxially of the pipe 12 and having a plurality of circularly arranged elongated linear passages 34 disposed concentrically of the impeller axis. For reasons hereinafter apparent, it is preferred that the impeller be fabricated from a suitable non-magnetizable material such as aluminum. The impeller is rotatably mounted on graphite bearings 36 supported on a shaft 38 fixed to and extending coaxially of an adjustable inlet strut 40 seated in the flanged end portion of the pipe 12. The impeller carries on its periphery an annular permanent magnet 42, with the magnet being fixed to the impeller for rotation therewith. It is preferred that the periphery of the impeller and magnet assembly be closely adjacent the inner wall of the pipe 12 to provide that only a minimum of fluid can flow between the periphery of the impeller-magnet assembly and the inner wall of the pipe. In order to accommodate the increased size of the impeller due to the mounting of the magnet thereon, the inner diameter of the pipe 12 is enlarged in the area registering with the impeller and inlet strut.

Disposed coaxially within the pipe and closely adjacent the impeller is a turbine 44, preferably cast from a light, non-magnetizable material such as magnesium. The turbine is generally cylindrical and, like the impeller, includes a plurality of circularly arranged elongated linear flow passages 46 disposed concentrically of the axis of the pipe 12 and axis of the impeller 32. As will be apparent from FIG. 2, the passages 46 in the turbine are aligned with the passages 34 in the impeller. The turbine is fixedly mounted on a shaft 48 extending coaxially therethrough. The shaft 48 extends in radially spaced relation coaxially through the shaft 38 supporting the impeller and is pivotally supported at its opposite ends by bearings carried in externally threaded supports 50 and 52 threadably mounted respectively on the inlet strut 40 and an outlet strut 54 formed integrally with the pipe 12 adjacent the end thereof opposite the flange 14. The outlet strut 54 comprises a plurality of angularly spaced arms 56 which support a central boss 57 coaxially within the pipe 12, with the boss being the portion of the strut supporting the shaft support 52. As will be apparent from FIG. 2, the shaft support 52 may be threaded inwardly and outwardly of the pipe to adjust the endwise play on the shaft 48. In this connection, the support 52 is provided with a screwdriver engageable slot at its outer end by means of which the support may be adjusted merely by inserting a screwdriver or the like in the corresponding end of the pipe 12. A locking nut 58 serves to lock the support 52 in adjusted position.

With reference to FIGS. 2 and 3, the inlet strut 40 comprises an annular hub portion 60 rotatably mounted in the end of the pipe 12 adjacent the flange 14. The hub 60 is provided with a shoulder matingly engageable with a corresponding step in the inner wall of the pipe 12 to seat the hub in the pipe and limit movement thereof inwardly of the pipe. A snap ring 62 engaged in an annular groove in the inner wall of the pipe 12 engages the hub 60 and maintains the strut 40 seated in the pipe in predetermined angular adjustment. The strut 40 further comprises a plurality of equi-angularly spaced arms 64 integral with the hub 60 and extending radially thereof and supporting at their inner ends a boss 66 which receives and fixedly supports one end of the impeller supporting shaft 38. A projection 68 extends outwardly from each of the arms 64 in parallel spaced relation to the central axis of the strut 40, with the projections 68 supporting at their outer ends a boss 70 arranged generally coaxially of the pipe 12 and threadably supporting the shaft support 50. As in the case of the shaft support 52, the support 50 is adjustable inwardly and outwardly of the pipe 12 to adjust the end play on the shaft 48 and is provided with a suitable slot at its outer end for adjustment of the support by means of a screw driver or the like inserted into the corresponding end of the pipe. A locking nut 72 locks the support 50 in adjusted position.

Disposed between the bosses 66 and 70 is a coil spring 74 concentrically arranged about the shaft 48 and secured at its inner end to the shaft. The outer end of the spring is releasably held by a spring clamp 76 including a plate 78 secured to the spring clamp 76 by a screw and clampingly engaging the outer end of the spring between the plate 78 and clamp 76. The spring clamp 76 is provided with a mounting base engaged between the locking nut 72 and boss 70, whereby the spring clamp, and thus the outer end of the spring, will be moved angularly, as a unit, about the axis of the shaft 48 in response to rotative movement of the strut 40 about the axis of the pipe 12. A generally cup-shaped housing or cover 80 is provided for the spring 74 and spring clamp 76. The housing 80 is provided with a plurality of slots extending longitudinally thereof and corresponding in angular relationship to the projections 68 on the strut 40 so that the cover may be slipped over these projections and positioned adjacent to the boss 66 of the strut. A nut 82 engaged over the outer end of the shaft support 50 retains the housing 80 on the support and thus in assembly with the strut. As will be apparent, the spring 74 exerts a restraining force on the turbine 44 to resist movement of the turbine about its axis. The rate of the spring may be adjusted by unclamping the outer end of the spring and moving the same toward or away from the spring clamp 76 and then reclamping the spring in its new position. This changes the length of the spring and hence its torque gradient or rate. As should be apparent and for a purpose which will be hereinafter described, the turbine may be adjusted about the axis of the turbine merely by rotating the inlet strut 40 relative to the pipe 12, the snap ring 62 maintaining the strut in its adjusted position.

Mounted on bearings on the exterior of the pipe 12 is a generally cylindrical driving magnet carrier 84 carrying a driving permanent magnet 86. The magnet carrier 84 is arranged concentrically of the impeller 32, with the magnet 86 registering with the magnet 42 carried by the impeller. The carrier 84 is provided with an integral ring gear 88 arranged coaxially of the impeller axis and drivingly engaged by a gear 90 mounted on a shaft 92 rotatably supported at one end in a bearing in the boss 21 on the flange 14. A gear 94 is also mounted for rotation with the shaft 92 and is engaged with a drive pinion 96 of an electric drive motor 98 disposed within the cover 22 and extending generally parallel to the pipe 12 in laterally spaced relation. The motor 98 is mounted by means (not shown) on the posts 18, 19, and 20 extending from the flange 14. Electrical leads (not shown) for the motor 98 extend outwardly through the cover 22 for connection to a suitable power source. As will be apparent, energizing of the motor 98 will effect rotation of the driving magnet 86. The rotation of the drive magnet 86 will, through the cooperating magnet 42 on the impeller, effect rotation of the impeller.

The stator assembly 100 of an electrical pick off or sensing means is mounted within the cover 22 and is supported by means of the posts 16 and 17 extending from the flange 14. The stator assembly is generally of annular configuration arranged coaxially about the pipe 12 in registry with the outer end of the turbine 44. The stator 100 generally comprises an annular coil 102 wound on an annular magnetic core 102a which cooperates in a known manner with permanent magnets 104 carried by the turbine to provide an electrical signal proportional to displacement of the turbine about its axis, this signal correspondingly being proportional to the mass flow of the fluid accelerated by the impeller.

Figure 4:
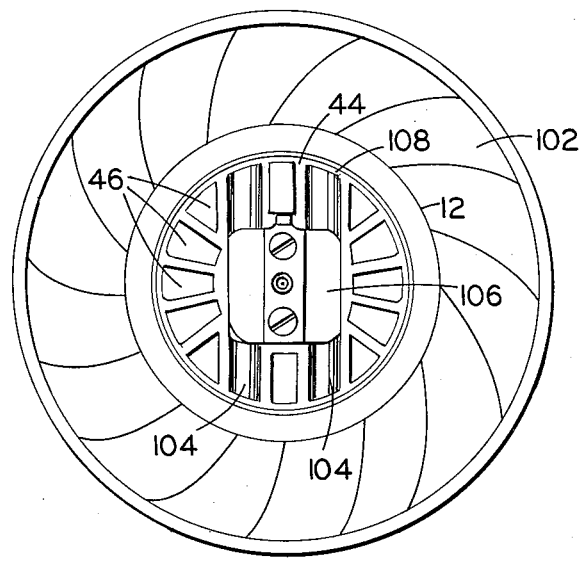
FIG. 4 is an enlarged end view of a portion of the flowmeter of FIG. 1.

With particular reference to FIGS. 2 and 4, the turbine-carried magnets consist of a pair of elongated magnets 104 extending in parallel spaced relation on opposite sides of the turbine axis and extending at right angles to the turbine axis. The magnets are received in pockets integrally cast in the turbine and are retained in these pockets by means of a retaining plate 106. It should be particularly noted that the outer cylindrical wall 108 of the turbine 44 extends in a shroud-like manner over the ends of the magnets 104 so that the ends of the magnets are not exposed to fluid in the pipe 12. This, in effect, embedding of the ends of the magnets 104 within the turbine eliminates any build-up of magnetizable particles on the ends of the magnets, which quantities of material may adversely affect the operation of the pick off.

The magnet retaining plate 106, as clearly shown in FIG. 2, is provided with an extension or arm 110 which extends in parallel spaced relation to the turbine axis and toward the outlet strut 56. Mounted on the shaft 52 intermediate the locking nut 58 and boss 57 of the strut 54 is a spring stop 112 comprising an arm or projection 114 extending parallel to the axis of the turbine in laterally spaced relation. The arms 110 and 114, as shown in FIGS. 1 and 2, are disposed at equal radii from the turbine axis and are engageable to limit rotation of the turbine in either direction about its axis. Adjustment of the turbine stop 112 about the axis of the turbine may be accomplished by backing off the locking nut 58 which clampingly secures the turbine stop in adjusted position. A lock washer 116 is engaged between the locking nut 58 and turbine stop 112 to lock the nut 58 against inadvertent, unintentional rotation.

In the use and operation of a flowmeter constructed as described above, the flowmeter is coupled to a fluid line by attaching a fluid conduit to the adaptor 28 and connecting another fluid conduit to the opposite end of the pipe 12 which is internally threaded, as shown in FIG. 2, for this purpose. The motor 98 is then energized so that it will, through the reduction gear train and magnetic coupling, rotate the impeller 32, preferably at a constant speed. Fluid flowing through the pipe 12 from the leftward inlet end, as viewed in FIG. 2, to the rightward outlet end will have imparted to it by the impeller a uniform angular acceleration about the axis of the impeller. This angular momentum imparted to the fluid by the impeller will be removed therefrom by the turbine 44 as the fluid passes through the passages thereof. The turbine will, accordingly, be deflected about its axis an amount corresponding to the momentum absorbed by the turbine and thus proportional to the mass flow of the fluid accelerated by the impeller. The deflections of the turbine will, of course, be sensed by the telemetering device comprising the magnets 104 and the coil 102 so as to provide an electrical signal which may serve to actuate an indicating device or the like to provide a visible indication or recording of the instantaneous mass flow rate of the fluid and/or the total mass flow of the fluid.

A particular advantage of the flowmeter constructed in accordance with this invention is that all of the elements, with the exception of the impeller, turbine, restraining spring, and magnets 104, are separted from the fluid in a manner which is both simple and economical. This feature of the invention is provided through the use of the pipe and flange construction for the main housing whereby the impeller, turbine, etc., are contained within the pipe 12, while the remaining elements are supported externally of the pipe by the flange 14. The separation of the driving elements of the flowmeter as well as the pick-off coil from the fluid is accomplished without the necessity of any expensive or complicated sealing arrangement, the seal 30 being the only seal between the inside of the pipe and the exterior thereof. It should be noted that this seal is on the side of the flange 14 opposite the elements supported by the flange and contained within the cover 22, so that in actuality there are no separate fluid seals between the interior of the pipe and the elements contained within the cover 22.

The pipe and flange construction of this flowmeter not only provides the desired separation of certain elements of the flowmeter from the fluid but also contributes to a very compact structure suitable for manufacture in a relatively small size. For example, a specific embodiment of a flowmeter constructed in accordance with this invention for measuring flow rate up to approximately 1200 pounds per hour has external dimensions of only approximately 2½" x 3½" x 4". The provision of the integral posts 16–20 on the flange 14 as well as the integral boss 21 simplifies assembly of the unit and minimizes the number of parts required and thus contributes to an over-all reduction in cost per unit.

Further, a flowmeter constructed in accordance with the invention is quite simple to assemble, the assembly essentially comprising the assembly of the impeller, turbine and inlet strut outside of the pipe 12, with the subsequent assembly of these elements as a unit within the pipe, the entire unit being held in place by the snap ring 62 engaged with the inlet strut 40. The assembly of the elements externally of the pipe 12 is obviously quite simple, these elements all being mounted on the various posts on the flange 14.

The end play adjustment of the turbine shaft, as apparent from the above description, may be made without disassembly of the flowmeter merely by simple adjustments at opposite ends of the pipe 12. Also, as will be apparent, the adjustment of the spring rate may be accomplished from the inlet end of the flowmeter without any major disassembly of the unit, only the removal of the cover 80 being required to enable this adjustment. It should be particularly noted that in order to adjust the angular relation of the turbine magnets 104 to the pick-off coil 102, or, in other words, to adjust the zero set of the pick off, the inlet strut 40 need only be rotated about the axis of the pipe 12 and relative to the pipe. This adjustment of the inlet strut, as apparent from the above, may be accomplished without any disassembly of the unit merely by insertion of a proper tool through the inlet end of the flowmeter.

The relatively large spacing of the supports for the turbine shaft, characterized by the location of these supports at opposite ends of the pipe 12 adjacent the opposite ends of the impeller-turbine array, affords improved support for the turbine and facilitates accurate alignment of the turbine shaft. Further, the particular arrangement of the impeller, turbine, turbine shaft, inlet strut, etc., making up the impeller-turbine subassembly materially facilitates assembly of this portion of the flowmeter as well as assembly of the over-all unit and thus reduces assembly time and effort.

While the invention has been described in terms of the specific embodiment shown in the accompanying drawings, it is to be understood that the foregoing description and accompanying drawings are to be taken only in an illustrative sense and that various modifications or alterations could be made in the specific structure shown without departing from the scope of the invention. Accordingly, it should be understood that the invention is to be limited only by the appended claims, which shall include within their scope all structure which logically falls within the language of these claims.

What I claim as new and desire to secure by Letters Patent of the United States is:

1. In a fluid mass flowmeter, a housing including a cylindrical member open at both ends, detecting means for providing a signal proportional to mass flow of fluid through the cylindrical member including a motor-driven fluid accelerating impeller, a turbine coaxially disposed within said cylindrical member in end-to-end array and sensing means for detecting the deflection of the turbine about its axis, an inlet strut mounted in said cylindrical member for rotative adjustment coaxially thereof, means rotatably supporting the impeller on the inlet strut, a shaft extending coaxially of said cylindrical member through said impeller and turbine and fixed for movement with the turbine about the turbine axis, means rotatably supporting one end of the shaft on the inlet strut, means rotatably supporting the other end of the shaft on said cylindrical member, and a restraining spring fixed to said shaft and inlet strut for yieldingly resisting deflection of the turbine about its axis.

2. In a fluid mass flowmeter, a housing including a cylindrical member open at both ends, detecting means for providing a signal proportional to mass flow of fluid through the cylindrical member including a motor-driven fluid accelerating impeller, a turbine coaxially disposed within said cylindrical member in end-to-end array and sensing means for detecting the deflection of the turbine about its axis, an inlet strut mounted in said cylindrical member for rotative adjustment coaxially thereof, a stub shaft fixed to said inlet strut and rotatably supporting the impeller, a second shaft extending coaxially through said stub shaft and turbine and fixed for movement with the turbine about the turbine axis, a restraining spring fixed to said second shaft and inlet strut for yieldingly resisting deflection of the turbine about its axis, first bearing means rotatably supporting one end of the second shaft on the inlet strut, and second bearing means rotatably supporting the other end of the second shaft on said cylindrical member, said first and second bearing means being mounted for selective adjustment axially of said second shaft to adjust the end play on said second shaft.

3. In a fluid mass flowmeter, a housing including a cylindrical member open at both ends, detecting means for providing a signal proportional to mass flow of fluid through the cylindrical member including a motor-driven fluid accelerating impeller, a turbine coaxially disposed within said cylindrical member in end-to-end array and sensing means for detecting the deflection of the turbine about its axis, an inlet strut including an annular hub portion coaxially and rotatably received in the cylindrical member adjacent one end thereof and next adjacent said impeller, a plurality of angularly spaced arms extending radially inwardly from the hub and terminating in a support portion disposed centrally of said cylindrical member, a hollow shaft carried by said support portion and rotatably supporting the impeller, each of said arms having projections extending longitudinally of the cylindrical member and away from said impeller and terminating in a second support portion disposed centrally of the cylindrical member, a second shaft extending coaxially of said cylindrical member through said first shaft and first support portion and turbine, said second shaft being rotatable relative to said first shaft and being fixed for movement with the turbine about the turbine axis, means rotatably supporting one end of said second shaft on said second support portion of the inlet strut, means rotatably supporting the other end of said second shaft on said cylindrical member, and means fixed to said second shaft and inlet strut resiliently resisting movement of said second shaft about its axis.

4. In a fluid mass flowmeter as described in claim 3, said means rotatably supporting said one end of said second shaft and said means rotatably supporting the other end of said second shaft on said cylindrical member respectively including a bearing carried by a manually adjustable support mounted on said second support portion for movement axially of said cylindrical member and a bearing carried by a manually adjustable support supported on said cylindrical member for movement axially thereof.

5. In a fluid mass flowmeter of the angular momentum type, a housing including a cylinder open at both ends and having an imperforate circumferential wall and a mounting plate integral with said cylinder and extending at right angles to the axis of said cylinder adjacent one end thereof, means for providing a signal proportional to the mass flow of a fluid through the cylinder including a rotatable fluid accelerating impeller disposed coaxially within the cylinder, a permanent magnet rotatably supported on the exterior of said cylinder for rotation coaxially of the impeller, a second permanent magnet on the impeller cooperating with the first magnet for rotation of the impeller in response to rotation of said first magnet, a plurality of posts integral with said mounting plate and extending at right angles therefrom toward said other end of the cylinder, an electric motor supported by said posts, a gear train at least in part supported by said mounting plate drivingly connecting the motor to said first magnet, a turbine disposed within the cylinder in coaxial axially spaced array with the impeller, means supporting the turbine on said cylinder for limited resiliently resisted rotation about the axis of the impeller, sensing means for detecting deflection of the turbine about its axis including a portion on the turbine cooperating with a portion disposed externally of the cylinder, and a plurality of additional posts integral with said mounting plate and disposed on the opposite side of the cylinder from and extending parallel to the first mentioned posts, said portion of the sensing means disposed externally of the cylinder being supported by said additional posts.

6. In a fluid mass flowmeter of the angular momentum type, a housing including a cylinder open at both ends and having an imperforate circumferential wall and a mounting plate integral with said cylinder and extending at right angles to the axis of said cylinder adjacent one end thereof, means for providing a signal proportional to the mass flow of a fluid through the cylinder including a rotatable fluid accelerating impeller disposed coaxially within the cylinder, a permanent magnet rotatably supported on the exterior of said cylinder for rotation coaxially of the impeller, a second permanent magnet on the impeller cooperating with the first magnet for rotation of the impeller in response to rotation of said first magnet, a plurality of posts integral with said mounting plate and extending at right angles therefrom toward said other end of the cylinder, an electric motor supported by said posts, a gear train drivingly connecting the motor to the magnet including a ring gear mounted for rotation with said first magnet and an intermediate gear connected to the ring gear, a shaft for the intermediate gear, an integral boss on the mounting plate, a bearing in said boss rotatably supporting one end of the intermediate gear shaft, a turbine disposed within the cylinder in coaxial axially spaced array with the impeller, means supporting the turbine on said cylinder for limited resiliently resisted rotation about the axis of the impeller, sensing means for detecting deflection of the turbine about its axis including a portion on the turbine cooperating with a portion disposed externally of the cylinder, a plurality of additional posts integral with said mounting plate and disposed on the opposite side of the cylinder from and extending parallel to the first mentioned posts, said portion of the sensing means disposed externally of the cylinder being supported by said additional posts, a cover supported on the edge portion of said mounting plate and on said other end of the cylinder and in cooperation with the mounting plate and cylinder enclosing the portions of the flowmeter disposed externally of the cylinder, and means on the cylinder engaging the cover and maintaining the cover in assembly with the mounting plate and cylinder.

References Cited in the file of this patent
UNITED STATES PATENTS

| | | |
|---|---|---|
| 2,602,330 | Kollsman | July 8, 1952 |
| 2,713,261 | Butterworth et al. | July 19, 1955 |
| 2,728,893 | Bartelink | Dec. 27, 1955 |
| 2,770,131 | Sparling | Nov. 13, 1956 |
| 2,832,218 | White | Apr. 29, 1958 |
| 2,877,649 | Powers | Mar. 17, 1959 |
| 2,907,208 | Taylor | Oct. 6, 1959 |
| 2,914,945 | Cleveland | Dec. 1, 1959 |
| 2,940,309 | Karlby | June 14, 1960 |
| 2,943,483 | Benson | July 5, 1960 |

FOREIGN PATENTS

| | | |
|---|---|---|
| 717,897 | Great Britain | Nov. 3, 1954 |